Aug. 29, 1967   R. W. KLEMM   3,338,179
LIFT MECHANISM FOR RAIL CONVEYORS
Filed Oct. 12, 1964   2 Sheets-Sheet 2
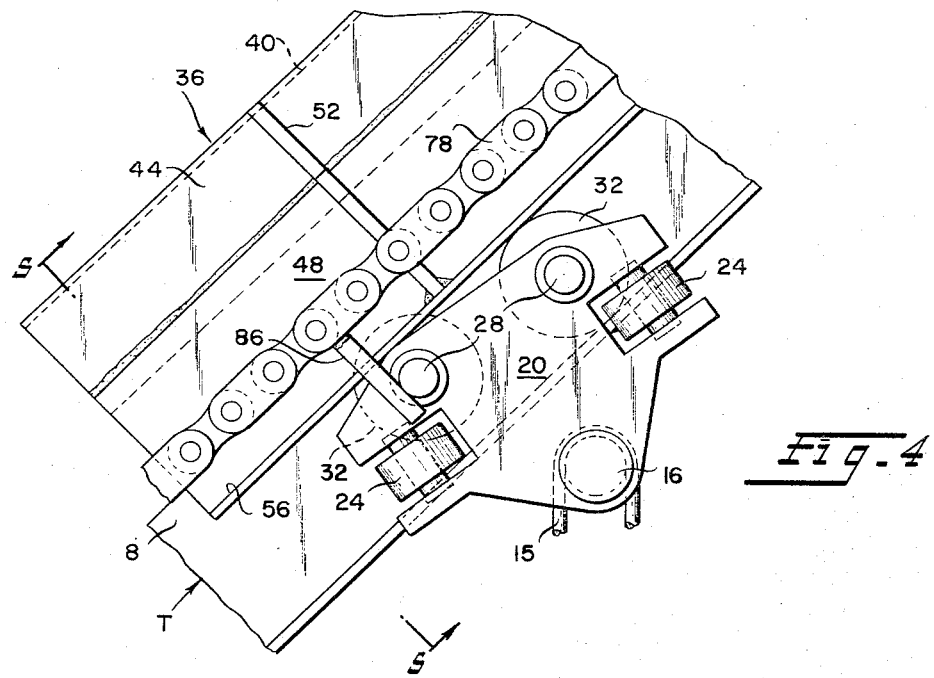
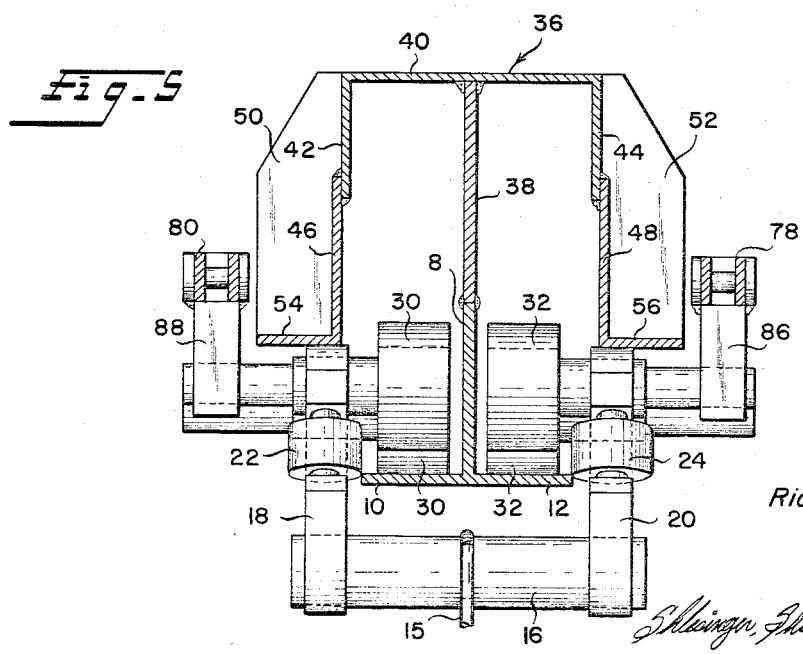
INVENTOR
Richard W. Klemm
ATTORNEYS United States Patent Office 3,338,179
Patented Aug. 29, 1967

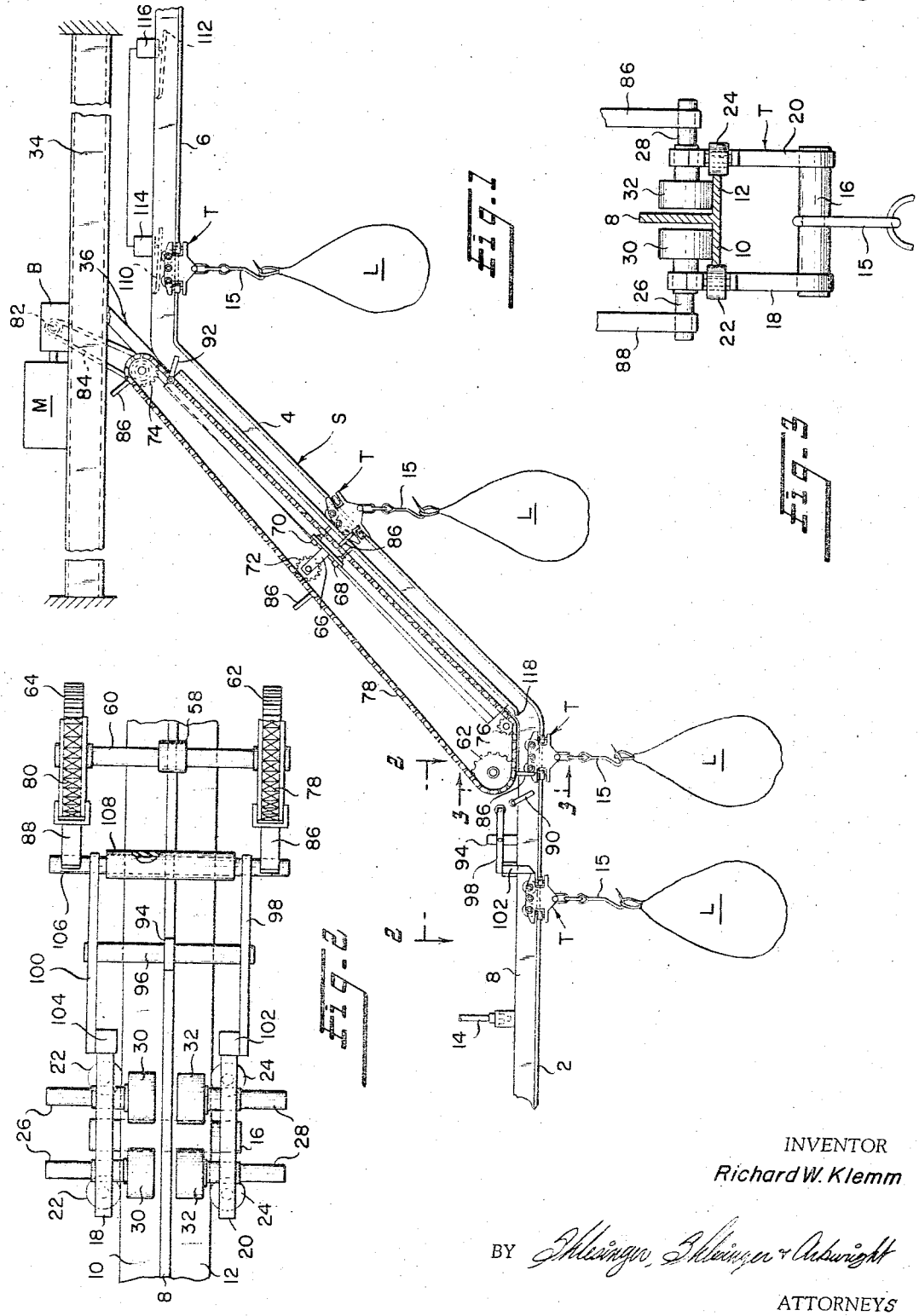

3,338,179
LIFT MECHANISM FOR RAIL CONVEYORS
Richard W. Klemm, 10419 Inwood Ave.,
Silver Spring, Md. 20902
Filed Oct. 12, 1964, Ser. No. 403,133
12 Claims. (Cl. 104—172)

This invention relates to improvements in apparatus for raising trolleys riding on rail conveyors from one elevation to another and particularly to means for reducing repair of the trolley mechanisms.

Over the years, there has been some development in lifting mechanisms for rail conveyor systems which involve the pushers for moving the trolleys which ride on the rails along the track. The trolleys have means for supporting a load such as a laundry bag, assembly part, electroplating parts, and the like. Usually the supporting means comprises a hook suspended from the trolley. The loads in some instances are quite considerable and weight distribution of the trolley on the track is of major consequence.

Typical of recent developments is Burmeister 3,048,123. Developments of this type utilize a pusher bar and some means for operating against the pusher bar. In all the known prior art, the means has been located to one side of the trolley only. Because of this arrangement, there is a considerable amount of twisting action of the trolley on the rail which causes severe wear on the trolley wheels as well as bending and deflection of portions of the trolley itself. When heavy loads particularly are used, this wear is increased particularly where the load is to be moved up an incline from one level to another.

In the past, gradual inclines have been required which utilizes a great deal of space for running tracks and the like. Additionally, duplicate sets of tracks and the like are required which involve high costs of installation as well as maintenance.

It is an object of this invention to provide means for reducing the wear of trolley wheels and the damage done by the twisting effect of present devices now available on the market.

Another object of this invention is to provide a means for raising a load from one level to another level up an incline in a very short lineal distance.

A further object of this invention is to provide a conveyor system which is simple and inexpensive to operate and maintain.

Still another object of this invention is to provide a conveyor system which allows the tracks to be set up with the maximum head room.

Yet a further object of this invention is to provide a conveyor system which will carry heavy loads up a sharp incline.

A further object of this invention is to provide means for separating trolleys one from the other without jamming the load handling mechanism.

Yet a further object of this invention is to provide a means for shutting off the load moving means should there be a backup in the trolleys due to assembly line stoppage or the like.

Another object of this invention is to provide a load handling mechanism for conveyors which is inexpensive to install and simple to maintain.

These and other objects of this invention will become apparent from a reading of the following specification and claims.

In the drawings:

FIGURE 1 is a side elevational view showing a portion of the conveyor system installed and carrying loads.

FIGURE 2 is a top plan view taken along the lines of 2—2 of FIGURE 1 and viewed in the direction of the arrows.

FIGURE 3 is an enlarged cross sectional view taken along the lines 3—3 of FIGURE 1 and viewed in the direction of the arrows.

FIGURE 4 is a side elevation view of a fragment of the elevating mechanism showing a single trolley as it would be with a load suspended therefrom.

FIGURE 5 is a cross sectional view taken on the lines 5—5 of FIGURE 4 and viewed in the direction of the arrows.

In FIGURE 1, the conveyor system S includes a lower level track 2, an inclined track 4, and an upper level track 6. The track as best shown in FIGURES 3 and 5, resembles an inverted T. The track includes a central web member or guide track 8 and side rails 10 and 12. The rails are supported from the ceiling by risers 14 or some similar structure. In general, the rails 2 and 6 are substantially horizontal although for operating purposes, they are usually downwardly inclined in the direction of travel of the loads to be carried thereby. The downward inclination is generally slight. A series of trolleys T are mounted for travel on the tracks 2, 4, and 6. The trolleys are conventional type mechanism such as are illustrated for example in Sgriccia et al. Patent No. 3,055,311. The trolleys and the rails may be of various types such as illustrated in the aforementioned patents. In general, the trolleys T, include a load support member 15 suspended from a cross pin 16 which in turn is supported by side brackets 18 and 20 as best shown in FIGURE 3. Side guide wheels 22 and 24 may be provided as in Patent 3,055,311. Mounted in the top of brackets 18 and 20 are stub axles 26 and 28 upon which are mounted pairs of wheels 30 and 32. The wheels 30 and 32 respectively rest on the upper surface of the rails 10 and 12. It is obvious that the rails may be formed from one integral plate as illustrated or may comprise a track and rail arrangement such as illustrated in Burmeister et al. 3,048,123.

In FIGURE 1, the load carrying means 15 support a load L.

A portion of the system S is supported from a beam 34 as illustrated in FIGURE 1.

Mounted on the beam 34 is a downwardly inclined T-structure 36 which comprises an upright 38 secured to the upright 8 of the track by welding or the like. The upright 38 is secured to the cross T plate 40 having flanges 42 and 44 to which are secured angle irons 46 and 48 as best seen in FIGURE 5. Brace plates or webs 50 and 52 are utilized to stiffen the structure and to brace the connection between the angle irons 46 and 48 and the flanges 42 and 44 respectively. The bottoms 54 and 56 of the angle irons 46 and 48 serve as limiting guides for the upper portions or body of the trolley T for reasons hereinafter described.

Mounted on the web 8 is a bracket 58 as best shown in FIGURE 2. Journalled in the bracket 58 is an axle 60 for a pair of sprocket wheels 62 and 64. On the web 8 of the portion of the track 4 is a bracket 66. The bracket 66 has vertical adjustment screws 68 and 70 for the purposes of raising and lowering the tension idler sprockets 72.

On the support brace or bracket member 36 is a bracket (not shown) which supports a pair of drive sprockets 74. At the lower end of the track 4 a pair of small idler sprockets 76 are mounted on a bracket member (not shown) on the web 8 of the track. In the case of sprockets 72, 74 and 76, only one of each pair is illustrated in the drawings.

A pair of belts or carriers 78 and 80 are supported on the various sprocket members 62, 64, 72, 74 and 76. These belts are endless and may comprise a chain link arrangement as illustrated or any other similar drive mechanism.

A motor M with a gear reduction box B has a power take-off 82 for driving a belt 84 which connects to the drive sprockets 74. Mounted on the belts 78 and 80 are a series of radially extending pusher members 86 and 88.

The pusher members 86 and 88 are mounted so as to be aligned with one another in spaced relationship on the belts 78 and 80.

At the bottom of the incline track 4 and mounted on the track 2 in advance of the belts 78 and 80, is a pivoted pawl 90. At the top of the incline track 4 is a similar pawl 92. The pawls act as backstops preventing the trolleys T from rolling backward down the incline if the system S is shut down.

Mounted on the web 8 is a bracket 94 having a shaft 96 on which is pivotally mounted a pair of arms 98 and 100. The arms 98 and 100 are weighted at one end by a pair of holding fingers 102 and 104. At the other end of the arms 98 and 100 is mounted a shaft 106 which extends beyond the arms 98 and 100 on either side thereof. A cushioning sleeve 108 is mounted on the shaft 106 between the arms 98 and 100. The purpose of the sleeve 108 is to cushion the shaft 106 against the web 8 of the rail 2.

It is to be noted that the fingers 102 and 104 are of sufficient length to engage the forward portion of a trolley T for purposes hereinafter described.

Mounted on the track 6 are two pressure plates 110 and 112. The pressure plates are so designed as to be in abutting relationship with microswitches 114 and 116. The microswitches 114 and 116 are connected to the motor M for purposes hereinafter described.

*Operation*

It will now be seen that when the loads A which may be laundry bags as illustrated, are placed on the trolleys T and the trolleys are placed on a track 2, a slight incline of the track 8 tends to cause the trolleys T to run down the track 2. The first trolley in a line will engage the fingers 102 and 104 and stop at that point on the track 2. When the motor of the belt mechanism has been started, the projecting or extending pusher arms 86 and 88 engage first the shaft 106 on the outside portions thereof and cause the arms 98 and 100 of the holding mechanism to pivot on the bracket 94 thereby lifting the fingers 102 and 104 and releasing a trolley T. Before the second trolley can pass, the fingers 102 and 104 which have released the first trolley, come down and block the advance of the second trolley T. The extending pusher arms 86 and 88 continue to advance and engage the pusher bars 26 and 28 of the trolley T and move it forward and pass the pawl 90. When the trolley hits the incline 4, the weight on the trolley shifts forward and tends to cause the rear wheels to ride upwardly or pivot about the forward wheels of the trolley T as generally illustrated in FIGURE 1. Guides 54 and 56 of the angle irons 46 and 48 are so positioned that the upper portions of the trolley ride against the bottom surfaces of the members 54 and 56 thereby limiting the pivoting of the trolleys T to avoid jamming of the track 4. When the trolleys T have reached the top of the inclined track 4, the one way pawl 92 permits the trolleys to pass in a forward direction but will not permit the trolleys to back down the slope or incline because of their very nature.

The microswitches 114 and 116 which are connected to the motor M are initially tripped by the first trolley T going through the system S. Microswitch 114 is first hit. Since the motor M will not shut-off unless both microswitches are simultaneously hit, the load on the trolley T will be allowed to pass down the track past microswitch 116. If now the track 6 should fill up with trolleys, they will eventually collect on the track 6 and in doing so will open both microswitches 114 and 116 simultaneously. This will stop the motor M until such time as the situation has been corrected.

Where in the prior art, the trolleys tended to have their wheels worn conically on their wheel axles bent because of the tendency of the load to twist in one direction with this structure, the two pusher members 86 and 88 acting on the pusher bars 26 and 28 of the trolley T distribute the load evenly and cause the trolley T to ride up the incline without a binding action. The ability of the trolleys to pivot forward while going up the incline reduces the amount of wear on the trolley wheels when on the incline track 4. If the guide rails or flanges 54 and 56 are spaced somewhat from the track, no great pressure will be brought against the forward wheels. It is obvious that if the forward wheels should wear slightly faster than the rear wheels, the trolley can be reversed in order to afford even wear on what would now be the forward wheels rather than the rear wheels.

It is now to be noted that the inclined portion 4 of the track need not be curved to meet the portion 2 nor the portion 6. A slight upturn 118 at the bottoms of the flanges 54 and 56 is provided to prevent any jamming of the trolleys T. It is to be further noted, that the endless belts 78 and 80 follow in general the lower track portion 2 and the inclined portion 4 including the sharp angle where the track 4 connects to the track 2.

Heretofore, all tracks which went from one elevation to a higher elevation had to be curved slightly for reasons as will be obvious from a study of the Burmeister Patent 3,048,123. Because of the channel arrangement of Burmeister and the necessity of having a separate set of pulleys for the pusher members, no sharp inclined track such as track 4 was possible. The arrangement of elements as described permits the inclined track portion 4 to be inclined upwardly at an angle of 45° or more from the horizontal without jamming or creating unnecessary wear on the trolleys T. Further no unnecessary torque is caused on the axles of the trolleys as would occur utilizing the systems illustrated in the patents referred to above.

It will be obvious that a raising and lowering of the sprockets 72 which engage the belts 78 and 80 will allow for adjustment of the slack thereon.

While the invention has been described, it will be understood that it is capable of further modifications and this application is intended to cover any variations, uses or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:
1. A lift mechanism for rail conveyors including
(a) a guide track having rail means at least a portion of said guide track being upwardly inclined,
(b) trolleys movably mounted on said guide track,
(c) each of said trolleys including body means,
(d) axle means forming pusher bars supported by said body means and extending from opposite sides of said body means,
(e) wheels mounted on said axle means in opposed relationship and in engagement with said rail means,
(f) load carrying means supported by each of said trolleys and vertically spaced below said axle means,
(g) carrier means mounted adjacent said guide track and in close association therewith,
(h) said carrier means comprising a pair of spaced endless belts,
(i) pusher members mounted on each of said spaced belts and extending outwardly therefrom for engagement with said pusher bars,
(j) said pusher members being in directly opposed relationship to form pairs of pusher members,
(k) means for actuating said carrier means to synchronously engage said pusher member pairs with said pusher bars extending from opposite sides of said body means, to move said trolley axially of said guide track,
(l) said body means pivoting upwardly with respect to said wheels when traversing the inclined portion of said guide track resulting from said load carrying means being under load,

(m) said pusher member pairs coacting with said pusher bars extending from opposite sides of said body means to resist the upward pivotal movement of said body when traversing the inclined portion of said guide track, and (n) whereby torsional stresses and frictional losses are minimized.

2. The combination as set forth in claim 1 with the addition of parallel, spaced guide means mounted above said rail means for limiting the upward pivotal movement of said body means with respect to said wheels when said load carrying means are under load and said trolleys are traversing the inclined portion of said guide track.

3. The combination as set forth in claim 2 wherein
   (a) said axle means extend beyond the lateral limits of said body means.

4. The combination as set forth in claim 3 wherein
   (a) said axle means includes a front axle and a rear axle, each having wheels mounted thereon.

5. The combination as set forth in claim 4 with the addition of
   (a) side guide wheels mounted on said body means adapted for engagement against said guide track to maintain said trolley in alignment with the axis of said guide track,
   (b) said side guide wheels being mounted in an axis normal to the axis of the said trolley wheels.

6. The combination as set forth in claim 5 with the addition of
   (a) trolley stop means in advance of said endless belt means,
   (b) said trolley stop means including a pivoted trip lever operated by said pusher members for successively releasing stacked trolleys one by one.

7. The combination as set forth in claim 6 with the addition of
   (a) back stop pawls connected to said guide track.

8. The combination as set forth in claim 7 with the addition of
   (a) at least two pressure switch mechanisms mounted on said guide track in spaced relationship to each other for stopping said carrier means when said guide track becomes overloaded.

9. A lift mechanism for rail conveyors including
   (a) a guide track having rail means,
   (b) at least a portion of said guide track being inclined,
   (c) parallel, spaced guide means connected to, and substantially coextensive with, the inclined portion of said guide track, said guide means being spaced above said rail means of said guide track,
   (d) trolleys movably mounted on said guide track,
   (e) each of said trolleys including body means,
   (f) axle means supported by said body means,
   (g) wheels mounted on said axle means in opposed relationship and in engagement with said rail means,
   (h) load carrying means supported by each of said trolleys and vertically spaced below said axle means,
   (i) a portion of said body means engaging said guide means resulting from a pivotal movement of said body means with respect to said wheel means when said load carrying means are under load and said trolleys are traversing the inclined portion of said guide track, and
   (j) means for moving said trolleys longitudinally of said guide track.

10. The combination as set forth in claim 9 wherein
    (a) said means for moving said trolleys includes an endless belt means mounted adjacent said guide track and in close association therewith.

11. The combination as set forth in claim 10 wherein
    (a) said axle means comprises a front axle and a rear axle,
    (b) said portion of the body means engaging the guide means when said wheels on said rear axle become disengaged from said guide track.

12. A lift mechanism for rail conveyors including
    (a) a guide track having rail means,
    (b) at least a portion of said guide track being inclined,
    (c) trolleys movably mounted on said guide track,
    (d) each of said trolleys including body means,
    (e) axle means supported by said body means,
    (f) wheels mounted on said axle means in opposed relationship and in engagement with said rail means,
    (g) said axle means extending substantially beyond the lateral limits of said body means to form pusher bars extending from opposite sides of the body means,
    (h) parallel, spaced guide means spaced above and connected to, and substantially coextensive with, the inclined portion of said guide track,
    (i) load carrying means supported by each of said trolleys and vertically spaced below said axle means,
    (j) carrier means mounted adjacent said guide track and in close association therewith,
    (k) said carrier means comprising a pair of spaced endless belts,
    (l) pusher members mounted on each of said spaced belts and extending outwardly therefrom for engagement with said pusher bars,
    (m) said pusher members being in directly opposed relationship to form pairs of pusher members,
    (n) means for actuating said carrier means to synchronously engage said pusher member pairs with said pusher bars extending from opposite sides of said body means, to move said trolley axially of said guide track, and
    (o) said guide means limiting the upward pivotal movement of said body means with respect to said wheels when said load carrying means are under load and said trolleys are traversing the inclined portion of said guide track.

References Cited

UNITED STATES PATENTS

| 1,317,745 | 10/1919 | Watson et al. | 198—174 |
| 1,417,528 | 5/1922 | Irish et al. | 104—91 |
| 1,916,255 | 7/1933 | Cabot | 198—37 |
| 1,917,836 | 7/1933 | Haddlesay | 104—91 |
| 2,945,453 | 7/1960 | Adams | 104—172 |
| 3,059,587 | 10/1962 | Dickson et al. | 104—172 |
| 3,092,040 | 6/1963 | Bingham | 105—150 |
| 3,178,006 | 4/1965 | Nigrelli et al. | 198—32 |

FOREIGN PATENTS 761,995   11/1956   Great Britain.

ARTHUR L. LA POINT, *Primary Examiner.*

DRAYTON E. HOFFMAN, *Examiner.*